(12) United States Patent
Moonen et al.

(10) Patent No.: US 8,119,802 B2
(45) Date of Patent: Feb. 21, 2012

(54) FLUORINATED DYES AND THEIR USE IN ELECTROPHORETIC DISPLAY DEVICES

(75) Inventors: Nicolle Moonen, Mannheim (DE); Stephan Hess, Dossenheim (DE); Jianqiang Qu, Ludwigshafen (DE); Markus Hoffmann, Speyer (DE); Ying-Syi Li, Fremont, CA (US); Jin Yang, Milpitas, CA (US); Gerhard Wagenblast, Wachenheim (DE); Alfred Rennig, Boechingen (DE); Thomas Gessner, Heidelberg (DE); Helmut Reichelt, Neustadt (DE); Patrick Amrhein, Hochheim (DE)

(73) Assignees: BASF Aktiengesellschaft, Ludwigshafen (DE); Sipix Imaging Inc., Fremont, CA (US)

( * ) Notice: Subject to any disclaimer, the term of this patent is extended or adjusted under 35 U.S.C. 154(b) by 956 days.

(21) Appl. No.: 11/846,969

(22) Filed: Aug. 29, 2007

(65) Prior Publication Data
US 2008/0269485 A1    Oct. 30, 2008

(30) Foreign Application Priority Data

Apr. 24, 2007   (EP) ................................. 07106784

(51) Int. Cl.
    $C07D\ 471/08$    (2006.01)
    $C09B\ 3/14$      (2006.01)
(52) U.S. Cl. .................. 546/37; 8/648; 8/657; 8/686
(58) Field of Classification Search .................. 546/37, 546/33; 8/657, 686, 648
    See application file for complete search history.

(56) References Cited

U.S. PATENT DOCUMENTS

| | | | |
|---|---|---|---|
| 7,390,901 B2 * | 6/2008 | Yang et al. | 546/33 |
| 2005/0039274 A1 * | 2/2005 | Yang et al. | 8/686 |

OTHER PUBLICATIONS

U.S. Appl. No. 12/667,765, filed Jan. 5, 2010, Langer, et al.

* cited by examiner

*Primary Examiner* — Charanjit Aulakh
(74) *Attorney, Agent, or Firm* — Oblon, Spivak, McClelland, Maier & Neustadt, L.L.P.

(57) ABSTRACT

This invention relates to process for preparing fluorinated dyes selected from the group consisting of compounds of the general formulae (I) and (III) and mixtures thereof by reacting the corresponding compounds which do not have $R^{12}$ or $R^{30}$ as substituents with compounds of the general formula $R^{12}A$ or $R^{30}A$ where A is selected from the group consisting of I and Br, the compounds obtained from said process and the use of these fluorinated dyes in electrophoretic displays.

9 Claims, No Drawings

FLUORINATED DYES AND THEIR USE IN ELECTROPHORETIC DISPLAY DEVICES

CROSS-REFERENCE TO RELATED APPLICATIONS

The present application claims priority to European patent application EP 07106784.7, filed on Apr. 24, 2007.

The present invention relates to fluorinated dyes selected from the group consisting of naphthyl- and perylenederivatives, and to a process for their preparation and to the use of the fluorinated dyes in electrophoretic displays.

An electrophoretic display (EPD) is a non-self luminescent display, which is also referred to as a reflective display. The functional principle is based on movement of charged particles in a solvent when an electrical field is applied. Typically, an EPD comprises a number of square shaped chambers (display segment) which are arranged evenly, on which upper and lower faces platelike electrodes are situated. At least one of these electrodes, preferably that on the monitoring side, is transparent.

An electrophoretic dispersion comprises a solution or dispersion of one or more dye and particles that are dispersed therein. This solution or dispersion is enclosed between the two electrodes. When a voltage is applied to these two electrodes, the particles, owing to the attractive force, migrate to the plate which has the opposite polarity to the pigment particle. As a result, the color which is observable through the transparent electrode is either the color of the solvent or of the particles.

The dispersion which is present in the display cell is undoubtedly the element which most strongly influences the quality of the cell. In general, the dispersion is composed of particles which are dispersed in a colored dielectric solvent or a mixture of such solvents. The composition of this dispersion determines the contrast ratio, the switching speed, the threshold properties and the stability of the component. In an ideal dispersion, the particles remain dispersed under all conditions, do not aggregate, do not sediment and do not froth.

The dispersion medium can be colored by dissolving or dispersing dyes in the dielectric solvent or the solvent mixture.

The prior art already discloses dyes which are suitable for use in electrophoretic displays.

WO 2005/017046 A2 discloses fluorinated dyes or colorants and their uses. The document mentioned discloses that the fluorinated dyes which have a fluorine content of at least 25% by weight and are mentioned therein are suitable for use in EPDs. Fluorinated phthalocyanines and naphthalocyanines are disclosed as dyes. In addition, dyes selected from the group consisting of anthraquinones, fluoroalkyl-substituted perylenes, fluoroalkyl-substituted quinacridones, fluoroalkyl-substituted diketopyrroles, fluoroalkyl-substituted porphyrins and fluoroalkyl-substituted naphthalimides are disclosed. In addition, various processes for preparing the dyes mentioned are disclosed, for example addition of alkyl iodides to copper phthalocyanines, formation of diimides by addition of amines to perylenetetracarboxylic dianhydride, or Suzuki coupling of corresponding boron compounds to bond a fluorinated radical to the aromatic radical via a —$CH_2$— group. Compounds which then have a —$CF_2$— group directly on the aromatics cannot be obtained in this way.

U.S. Pat. No. 3,281,426 discloses perfluoroalkylated phthalic anhydrides, copper phthalocyanines and a process for their preparation. This process consists in reacting the non-perfluorinated aromatic substrates with an appropriate perfluoroalkyl iodide at a temperature between 200 and 350° C.

There is still a need for improvement of certain characteristics of fluorinated dyes regarding solubility in suitable solvents, optical contrast ratio (OCR) and switching speed. There is also a need for the improvement of OCR of fluorinated dyes that are used as single dye in optical displays in respect to compounds prepared according to the prior art. A further need exists for a process for the preparation of fluorinated dyes that can be utilized in optical displays which can be conducted at lower temperatures, in order to reduce the costs of the process.

It is therefore an object of the present invention to provide a process for preparing fluorinated dyes, which provides the desired compounds in a narrow distribution of compounds with substantially identical degree of substitution and/or substitution pattern. The side chains of these dyes introduced by the process should have maximum fluorination, i.e. a —$CF_2$— group should then also be present directly on the aromatic part. In addition, the process according to the invention shall be applicable to a large group of different dyes, and be simple to perform, if at all possible in a single process step. It is a further object of the present invention to provide fluorinated dyes which are suitable for use in electrophoretic displays by virtue of improved properties.

This object is achieved by a process for preparing fluorinated dyes selected from the group consisting of compounds of the general formula I

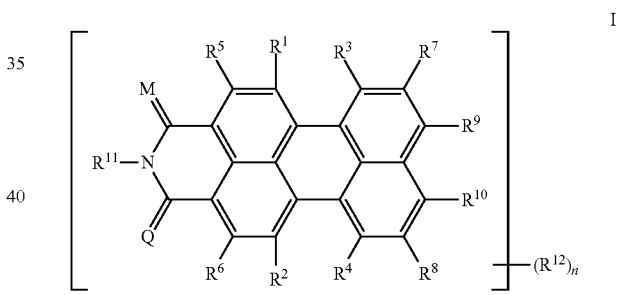

where $R^1$ to $R^8$ are each independently selected from the group consisting of hydrogen, halogen, $C_6$-$C_{22}$-aryl radical, $C_6$-$C_{22}$-heteroaryl radical, CN, $R^{13}$—O—, $R^{13}$—S—, $R^{13}R^{14}$N—, where $R^{13}$ and $R^{14}$ are each independently selected from the group consisting of hydrogen, $C_1$-$C_{20}$-alkyl radical, $C_2$-$C_{20}$-heteroalkyl radical, $C_6$-$C_{22}$-aryl radical, $C_6$-$C_{22}$-heteroaryl radical, where the aryl and heteroaryl radicals are optionally bonded to the base structure via a saturated or unsaturated carbon bridge having from 1 to 6 carbon atoms and the alkyl-, heteroalkyl-, aryl- and heteroaryl radicals can be partially or fully fluorinated, M and Q are each O or one of M and Q is O and the other is N—$R^{15}$, $R^9$, $R^{10}$ are each independently hydrogen, halogen, $C_6$-$C_{22}$-aryl radical, $C_6$-$C_{22}$-heteroaryl radical, CN, $R^{16}$—O—, $R^{16}$—S—, $R^{16}R^{17}$N—, where $R^{16}$ and $R^{17}$ are each independently selected from the group consisting of hydrogen, $C_1$-$C_{20}$-alkyl radical, $C_2$-$C_{20}$-heteroalkyl radical, $C_6$-$C_{22}$-aryl radical, $C_6$-$C_{22}$-heteroaryl radical, where the aryl and heteroaryl radicals are optionally bonded to the base structure via a saturated or unsaturated carbon bridge having from 1 to 6 carbon atoms and the alkyl-, heteroalkyl-, aryl- and heteroaryl radicals can be partially or fully fluorinated, or together form a cycle of the general formula II

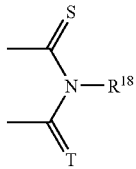

where S and T are each O or one of S and T is O and the other is N—$R^{19}$, $R^{12}$ is a fully or partly fluorinated $C_4$-$C_{12}$-alkyl radical and n is from 1 to 12, where, if $R^9$ and $R^{10}$ are each hydrogen, halogen, $C_6$-$C_{22}$-aryl radical, $C_6$-$C_{22}$-heteroaryl radical, CN, $R^{16}$—O—, $R^{16}$—S—, $R^{16}R^{17}N$—, where $R^{16}$ and $R^{17}$ are each independently selected from the group consisting of hydrogen, $C_1$-$C_{20}$-alkyl radical, $C_2$-$C_{20}$-heteroalkyl radical, $C_6$-$C_{22}$-aryl radical, $C_6$-$C_{22}$-heteroaryl radical, where the aryl and heteroaryl radicals are optionally bonded to the base structure via a saturated or unsaturated carbon bridge having from 1 to 6 carbon atoms and the alkyl-, heteroalkyl-, aryl- and heteroaryl radicals can be partially or fully fluorinated, M and Q are each O and $R^{11}$ is selected from the group consisting of hydrogen, halogen, $C_1$-$C_{20}$-alkyl radical, $C_1$-$C_{20}$-heteroalkyl radical, $C_6$-$C_{22}$-aryl radical and $C_6$-$C_{22}$-heteroaryl radical, where the aryl and heteroaryl radicals are optionally bonded to the nitrogen via a saturated or unsaturated carbon bridge having from 1 to 6 carbon atoms and the alkyl-, heteroalkyl-, aryl- and heteroaryl radicals can be partially or fully fluorinated, and the alkyl or heteroalkyl radicals may have functional radicals, or, if $R^9$ and $R^{10}$ form a cycle of the general formula II and M, Q, S and T are each O, $R^{11}$ and $R^{18}$ are each independently selected from the group consisting of hydrogen, halogen, $C_1$-$C_{20}$-alkyl radical, $C_1$-$C_{20}$-heteroalkyl radical, $C_6$-$C_{22}$-aryl radical and $C_6$-$C_{22}$-heteroaryl radical, where the aryl and heteroaryl radicals are optionally bonded to the nitrogen via a saturated or unsaturated carbon bridge having from 1 to 6 carbon atoms and the alkyl-, heteroalkyl-, aryl- and heteroaryl radicals can be partially or fully fluorinated and the alkyl or heteroalkyl radicals may have functional groups, or, if $R^9$ and $R^{10}$ form a cycle of the general formula II and M, Q, S and T are each O, each of $R^{11}$ and $R^{18}$ together form a saturated or unsaturated, branched or unbranched carbon bridge having from 1 to 18 carbon atoms between two molecules of the compound of the general formula (I) irrespective of the remaining $R^{11}$ and/or $R^{18}$, or, if $R^9$ and $R^{10}$ form a cycle of the general formula II and at least one of M, Q, S and T is N—$R^{15}$ or N—$R^{19}$, $R^{11}$, $R^{15}$, $R^{18}$ and $R^{19}$ are each independently selected from the group consisting of hydrogen, halogen, $C_1$-$C_{20}$-alkyl radical, $C_1$-$C_{20}$-heteroalkyl radical, $C_6$-$C_{22}$-aryl radical and $C_6$-$C_{22}$-heteroaryl radical, where the aryl and heteroaryl radicals are optionally bonded to the nitrogen via a saturated or unsaturated carbon bridge having from 1 to 6 carbon atoms and the alkyl-, heteroalkyl-, aryl- and heteroaryl radicals can be partially or fully fluorinated, or, if $R^9$ and $R^{10}$ form a cycle of the general formula II and at least one of M, Q, S and T is N—$R^{15}$ or N—$R^{19}$, $R^{11}$ and $R^{15}$ and/or $R^{18}$ and $R^{19}$, in each case together with the —N—C=N— moiety, each independently form saturated or unsaturated cycles having a total of from 4 to 20 ring atoms in each case, where at least one further ring atom may be a heteroatom selected from N, O, P or S, compounds of the general formula III

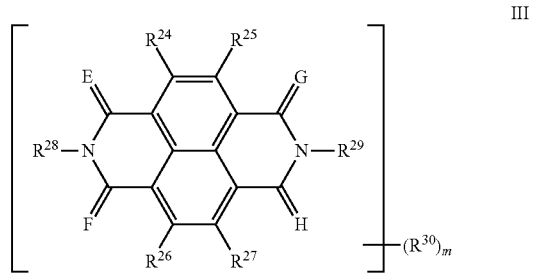

where
$R^{24}$ to $R^{27}$ are each independently selected from the group consisting of hydrogen, halogen, $C_6$-$C_{22}$-aryl radical, $C_6$-$C_{22}$-heteroaryl radical, CN, $R^{31}$—O—, $R^{31}$—S—, $R^{31}R^{32}N$—, where $R^{31}$ and $R^{32}$ are each independently selected from the group consisting of hydrogen, $C_1$-$C_{20}$-alkyl radical, $C_2$-$C_{20}$-heteroalkyl radical, $C_6$-$C_{22}$-aryl radical, $C_6$-$C_{22}$-heteroaryl radical, where the aryl and heteroaryl radicals are optionally bonded to the aromatics via a saturated or unsaturated carbon bridge having from 1 to 6 carbon atoms and the alkyl-, heteroalkyl-, aryl- and heteroaryl radicals can be partially or fully fluorinated, E, F are each O, or one of E and F is O and the other is N—$R^{33}$,
G, H are each O, or one of G and H is O and the other is N—$R^{34}$,
$R^{28}$, $R^{29}$, $R^{33}$ and $R^{34}$ are each independently selected from the group consisting of hydrogen, halogen, $C_1$-$C_{20}$-alkyl radical, $C_1$-$C_{20}$-heteroalkyl radical, $C_6$-$C_{22}$-aryl radical and $C_6$-$C_{22}$-heteroaryl radical, where the aryl and heteroaryl radicals are optionally bonded to the nitrogen via a saturated or unsaturated carbon bridge having from 1 to 6 carbon atoms and the alkyl-, heteroalkyl-, aryl- and heteroaryl radicals can be partially or fully fluorinated, or $R^{28}$ with $R^{33}$ and/or $R^{29}$ with $R^{34}$, in each case together with the —N—C=N— moiety, each independently form saturated or unsaturated cycles having a total of from 4 to 20 ring atoms in each case, where at least one further ring atom may be a heteroatom selected from N, O, P or S, or $R^{30}$ is a fully or partly fluorinated $C_4$-$C_{12}$-alkyl radical and m is from 2 to 16, and mixtures of the compounds of the general formulae (I) and (III)

by reacting the corresponding compounds which do not have $R^{12}$ or $R^{30}$ with compounds of the general formula $R^{12}A$ or $R^{30}A$ where A is selected from the group consisting of I and Br and $R^{12}$ and $R^{30}$ are each as defined above.

In the context of the present invention, the term "alkyl radical" comprises a saturated or unsaturated, branched or unbranched chain consisting of carbon and hydrogen atoms with the mentioned number of carbon atoms and the corresponding number of hydrogen atoms.

In the context of the present invention, the term "heteroalkyl radical" comprises a saturated or unsaturated, branched or unbranched chain consisting of carbon, hydrogen and hetero atoms with the mentioned number of carbon atoms and the corresponding number of hydrogen atoms.

In the context of the present invention, the term "aryl radical" comprises a cyclic radical having an aromatic skeletal structure consisting of carbon and hydrogen atoms with the mentioned number of carbon atoms and the corresponding number of hydrogen atoms.

In the context of the present invention, the term "heteroaryl radical" comprises a cyclic radical having an aromatic skeletal structure consisting of carbon, hydrogen and hetero atoms with the mentioned number of carbon atoms and the corresponding number of hydrogen atoms.

Alkyl-, cycloalkyl-, aryl- and heteroaryl radicals according to the present invention can optionally be substituted with further alkyl-, cycloalkyl-, aryl- und/oder heteroaryl radicals or with functional groups like for example keto-, aldehyde-, ether-, thioether-, amine-, amide-, imine-, imide-, halogene-, hydroxy-, carboxylic acid-, anhydride, cyanide-oder isocyanate-groups.

In the context of the present invention the term "heteroatoms" comprises N, O, P and S.

In a preferred embodiment, in the compound of the general formula (I), $R^1$ to $R^8$ are each selected from the group consisting of hydrogen, halogen, CN, $C_6$-$C_{22}$-aryl radical, $C_6$-$C_{22}$-heteroaryl radical, $R^{13}$—O—, $R^{13}$—S— and $R^{13}R^{14}N$—, where $R^{13}$ and $R^{14}$ are each independently selected from the group consisting of hydrogen, $C_1$-$C_{20}$-alkyl radical, $C_2$-$C_{20}$-heteroalkyl radical, $C_6$-$C_{22}$-aryl radical, $C_6$-$C_{22}$-heteroaryl radical; more preferably, in the compound of the general formula (I), $R^1$ to $R^4$ are selected from the group consisting of hydrogen, halogen, $C_6$-$C_{22}$-aryl radical, $C_6$-$C_{22}$-heteroaryl radical, $R^{13}$—O—, $R^{13}$—S— and $R^{13}R^{14}N$, where $R^{13}$ and $R^{14}$ are each independently selected from the group consisting of hydrogen, $C_1$-$C_{20}$-alkyl radical, $C_2$-$C_{20}$-heteroalkyl radical, $C_6$-$C_{22}$-aryl radical, $C_6$-$C_{22}$-heteroaryl radical, and $R^5$ to $R^8$ are each hydrogen; even more preferably, in the compound of the general formula (I), $R^1$ to $R^4$ are each hydrogen, fluorine, chlorine, bromine, iodine, $R^{13}$—O— or $R^{13}$—S—, where $R^{13}$ and $R^{14}$ are each independently selected from the group consisting of $C_1$-$C_{20}$-alkyl radical, $C_6$-$C_{22}$-aryl radical, for example phenyl or naphthyl, or $C_6$-$C_{22}$-heteroaryl radical, and $R^5$ to $R^8$ are each hydrogen; especially preferably, $R^1$ to $R^4$ are each O-phenyl or chlorine and $R^5$ to $R^8$ are each hydrogen.

In the compound of the general formula (I), the $R^{13}$, $R^{14}$, $R^{16}$ and $R^{17}$ radicals may be substituted by at least one $C_1$-$C_{20}$-alkyl radical, $C_2$-$C_{20}$-heteroalkyl radical, $C_6$-$C_{22}$-aryl radical, $C_6$-$C_{22}$-heteroaryl radical and/or a functional group selected from hydroxyl, amino or halogen group.

When $R^9$, $R^{10}$ are each independently hydrogen, halogen, $C_6$-$C_{22}$-aryl radical, $C_6$-$C_{22}$-heteroaryl radical, CN, $R^{16}$—O—, $R^{16}$—S—, $R^{16}R^{17}N$—, where $R^{16}$ and $R^{17}$ are each independently selected from the group consisting of hydrogen, $C_1$-$C_{20}$-alkyl radical, $C_2$-$C_{20}$-heteroalkyl radical, $C_6$-$C_{22}$-aryl radical, $C_6$-$C_{22}$-heteroaryl radical, where the aryl and heteroaryl radicals are optionally bonded to the base structure via a saturated or unsaturated carbon bridge having from 1 to 6 carbon atoms and the alkyl-, heteroalkyl-, aryl- and heteroaryl radicals can be partially or fully fluorinated, the compounds of the general formula (I) present are those which, in addition to the substituents mentioned for $R^9$ and $R^{10}$, have an imide or —N═C—N— moiety.

In a preferred embodiment, $R^9$ and $R^{10}$ are each independently hydrogen, halogen, more preferably bromine or iodine, partially or fully fluorinated $C_1$-$C_{20}$-alkyl radical or $C_6$-$C_{22}$-aryl radical, $R^{16}$—O—, $R^{16}$—S—, where $R^{16}$ is a partly or fully fluorinated $C_1$-$C_{20}$-alkyl radical or $C_6$-$C_{22}$-aryl radical, more preferably phenyl.

In a particularly preferred embodiment, $R^9$ is hydrogen and $R^{10}$ is one of the abovementioned substituents. In a further particularly preferred embodiment, $R^9$ and $R^{10}$ are each hydrogen.

In a further preferred embodiment, $R^9$ and $R^{10}$ together form a cycle of the general formula II

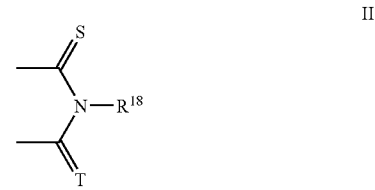

where S and T are each O or one of S and T is O and the other is N—$R^{19}$.

When $R^9$ and $R^{10}$ together form a cycle of the general formula (II), the compounds preparable in accordance with the invention are those which have either two imide, two —N═C—N— moieties or one imide and one —N═C—N— moiety.

When $R^9$ and $R^{10}$ in a compound of the general formula (I) form a cycle of the general formula (II) and M, Q, S and T are each O, the compounds present are those which have two imide groups.

In these compounds comprising two imide groups, $R^{11}$ and $R^{18}$ in a preferred embodiment are each independently selected from the group consisting of $C_1$-$C_{20}$-alkyl radical, $C_1$-$C_{20}$-heteroalkyl radical, $C_6$-$C_{22}$-aryl radical, $C_6$-$C_{22}$-heteroaryl radical and radical of the formula $(CH_2)_o C_p F_{(2p+1)}$ where o is 0, 1, 2, 3, 4 and p is from 1 to 12; preferably, o is 1 or 2 and p is 8. Aryl radicals may preferably be attached to the nitrogen via a carbon bridge having from 1 to 3, more preferably 2, carbon atoms.

In the case that $R^9$ and $R^{10}$ form a cycle of the general formula (II), M, Q, S and T are each O, and each of $R^{11}$ and $R^{18}$ together form a carbon bridge between two molecules of the compound of the general formula (I) irrespective of the remaining $R^{11}$ and/or $R^{18}$, the compounds present are dimers of the compounds of the general formula (I). These dimers may be joined to one another via one $R^{11}$ and one $R^{18}$ radical, via two $R^{11}$ radicals or via two $R^{18}$ radicals. In order to obtain such a bridge, an appropriate diamine having from 1 to 18 carbon atoms, preferably from 2 to 12, more preferably from 2 to 8 carbon atoms, for example ethylene-, pentylene-, phenylene- and hexamethylenediamine, must be used in the formation of the imide from the anhydride. The second amine function which remains in the molecule after the imide formation can then be reacted with a second molecule of anhydride, so as to obtain a dimer, bridged via the diamine, of a compound of the general formula (I).

When $R^9$ and $R^{10}$ in a compound of the general formula (I) form a cycle of the general formula (II) and at least one of M, Q, S and T is O, N—$R^{15}$ or N—$R^{19}$, the compounds present are those which have two —N═C—N— groups or one —N═C—N— group and one imide group.

In a further preferred embodiment, in these compounds of the general formula (I) which have two —N═C—N— groups or one —N═C—N— group and one imide group, $R^{11}$ and $R^{15}$ and/or $R^{18}$ and $R^{19}$, in each case together with the —N═C═N— moiety, each independently form saturated, unsaturated or aromatic cycles having a total of from 4 to 8 ring atoms, preferably 5 or 6 ring atoms, in each case, where at least one further ring having from 4 to 8 ring atoms may be attached to this ring, and may in turn optionally be substituted by at least one substituent selected independently from $C_1$-$C_{20}$-alkyl radical, preferably methyl, $C_6$-$C_{22}$-aryl radical, preferably phenyl, $R^{20}$—O— or $R^{20}$—S—, where $R^{20}$ is selected from the group consisting of $C_1$-$C_{20}$-alkyl radical, preferably $C_1$-$C_6$-alkyl radical, $C_6$-$C_{22}$-aryl radical, for example phenyl or naphthyl, or $C_6$-$C_{22}$-heteroaryl radical.

In a particularly preferred embodiment, in the compounds of the general formula (I) in which $R^9$ and $R^{10}$ form a cycle of the general formula (II) and at least one of M, Q, S and T is N—$R^{15}$ or N—$R^{19}$, from 1 to 4, preferably 1 or 2, further aliphatic or aromatic cycles having a total of from 5 to 8, preferably 5 or 6, ring atoms in each case, of which at least one further atom may be a heteroatom selected from the group consisting of N, O, P and S, are attached to the cycle which bears the —N—C=N— moiety and has a total of 5 or 6 ring atoms via two common ring atoms.

In compounds of the general formula (I) in which $R^9$ and $R^{10}$ form a cycle of the general formula (II), and in which one of M and Q is N—$R^{15}$ and one of S and T is N—$R^{19}$, and in which $R^{11}$ with $R^{15}$ and $R^{18}$ with $R^{19}$, in each case together with the —N=C—N— moiety, form the abovementioned cycles, these compounds are present either in the cis arrangement or in the trans arrangement or in a mixture of cis- and trans isomer.

When M is N—$R^{15}$ and S is N—$R^{19}$, the compound is in the cis arrangement. When M is N—$R^{15}$ and T is N—$R^{19}$, the compound is in the trans arrangement. When Q is N—$R^{15}$ and S is N—$R^{19}$, the compound is in the trans arrangement. When Q is N—$R^{15}$ and T is N—$R^{19}$, the compound is in the cis arrangement.

In a further preferred embodiment, in compounds of the general formula (I), $R^{12}$ is a fully or partly fluorinated $C_6$-$C_{10}$-alkyl radical, more preferably a —$C_8F_{17}$ radical. The radicals may be branched or linear, preferably linear.

In a further preferred embodiment, n in compounds of the general formula (I) is from 2 to 10, more preferably from 3 to 8, particularly preferably 4 to 6. Even though the distribution of compounds with different degrees of substitution n is narrow by virtue of the process according to the invention, there is nevertheless a small degree of scatter, so that the values specified for n are mean values over all molecules present.

Particularly preferred compounds of which do not contain $R^{12}$ for the preparation of compounds of the general formula (I) are selected from the group consisting of compounds of the formulae IV to XIV:

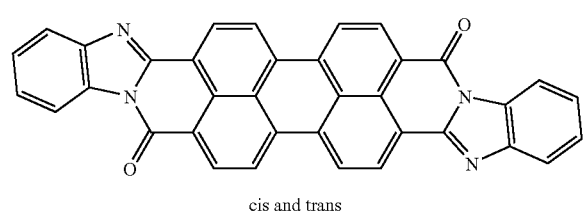

IV cis and trans

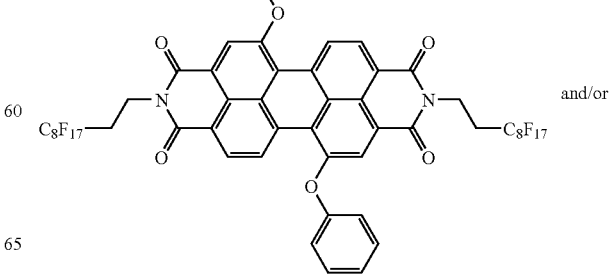

V cis and trans

VI cis and trans

VII

VIII

IX cis and trans

X and/or

XI

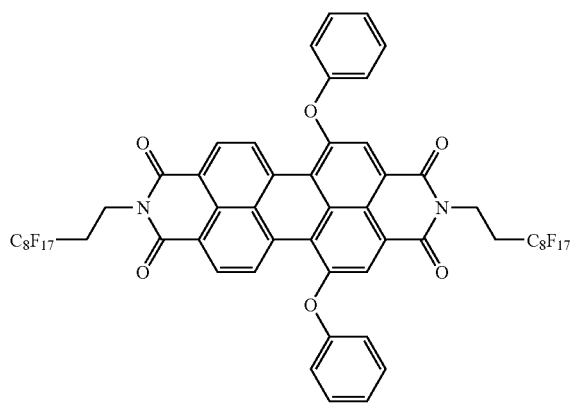

XII

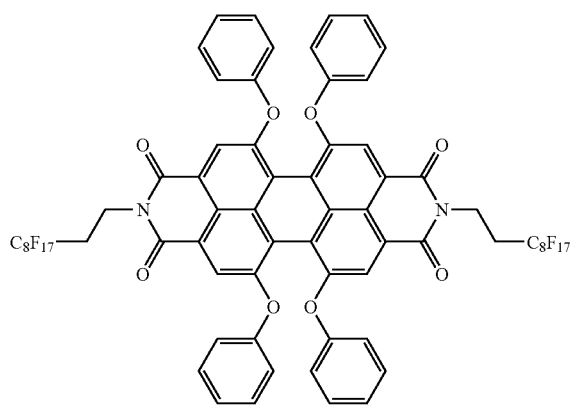

XIII

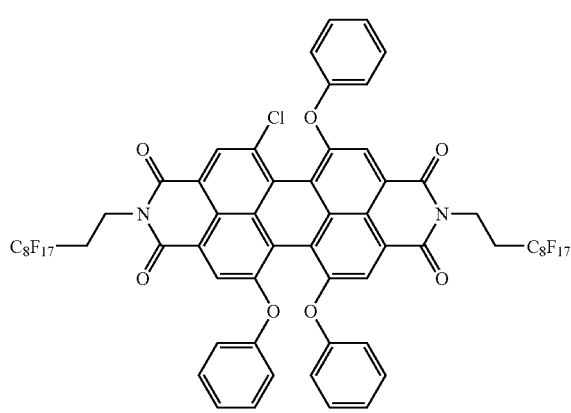

XIV

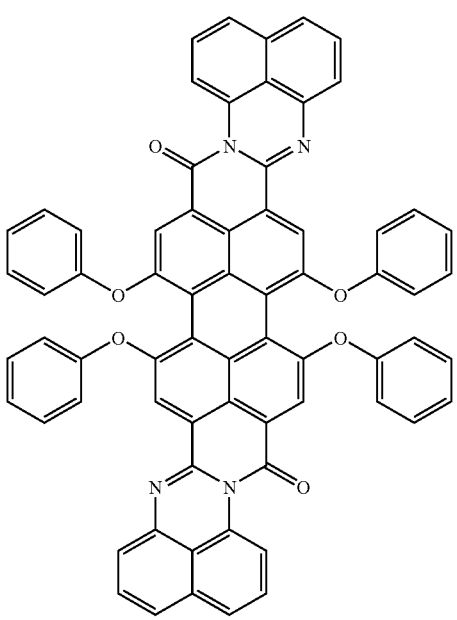

cis and trans

The basic structure XIV is disclosed in Quante, H., Geerts, Y., Muellen, K., Synthesis of soluble Perylenebisamidine Derivatives, Novel Long-Wavelength Absorbing and fluorescent Dyes, Chemistry of Materials (1997), 9(2), 495 to 500. Preparation of compounds X and XI is described in WO 97/22607 and WO 97/22608.

The particularly preferred number of $R^{12}$-groups in compounds as mentioned above can be derived from table 1.

In a further preferred embodiment, in compounds of the general formula (III), $R^{24}$ to $R^{27}$ are each independently selected from the group consisting of hydrogen, halogen, $C_6$-$C_{22}$-aryl radical, $C_6$-$C_{22}$-heteroaryl radical, $R^{31}$—O—, $R^{32}$—S— and $R^{31}R^{32}N$—, where $R^{31}$ and $R^{32}$ are each independently selected from the group consisting of hydrogen, $C_1$-$C_{20}$-alkyl radical, $C_2$-$C_{20}$-heteroalkyl radical, $C_6$-$C_{22}$-aryl radical, $C_6$-$C_{22}$-heteroaryl radical; more preferably, in the compound of the general formula (III), $R^{24}$ to $R^{27}$ are each hydrogen, fluorine, chlorine, bromine or iodine, $R^{31}$—O— or $R^{31}$—S—, where $R^{31}$ is selected from the group consisting of $C_1$-$C_{20}$-alkyl radical, $C_6$-$C_{22}$-aryl radical, for example phenyl or naphthyl.

In the compound of the general formula (III), the $R^{31}$ and $R^{32}$ radicals may be substituted by at least one $C_1$-$C_{20}$-alkyl radical, $C_2$-$C_{20}$-heteroalkyl radical, $C_6$-$C_{22}$-aryl radical, $C_6$-$C_{22}$-heteroaryl radical and/or a functional group selected from hydroxyl, amino or halogen group.

In a further preferred embodiment, in compounds of the general formula (III), $R^{28}$ with $R^{33}$ and/or $R^{29}$ with $R^{34}$, in each case together with the —N—C=N— moiety, each independently form saturated or unsaturated cycles having a total of from 4 to 8 ring atoms in each case, where at least one further ring having from 4 to 8 ring atoms may be attached to this ring and may in turn optionally be substituted by at least one substituent selected independently from $C_1$-$C_{20}$-alkyl radical, preferably methyl $C_6$-$C_{22}$-aryl radical, preferably phenyl, $R^{22}$—O— or $R^{22}$—S—, where $R^{22}$ is selected from the group consisting of $C_1$-$C_{20}$-alkyl radical, preferably $C_1$-$C_6$-alkyl radical, $C_6$-$C_{22}$-aryl radical, for example phenyl or naphthyl, or $C_6$-$C_{22}$-heteroaryl radical.

In a further preferred embodiment, in compounds of the general formula (III), $R^{30}$ is a fully or partly fluorinated $C_6$-$C_{10}$-alkyl radical, where a —$CF_2$— group is then present directly on the aromatics; more preferably, $R^{30}$ is a —$C_8F_{17}$ radical.

In a further preferred embodiment, m in compounds of the general formula (III) is from 4 to 10, more preferably from 6 to 8. Even though the distribution of compounds with different degrees of substitution m is narrow by virtue of the process according to the invention, there is nevertheless a low degree of scatter, such that the values specified for m are mean values over all molecules present.

Very particularly preferred compounds of the general formula (III) are the following compounds of formulae XX and XXI:

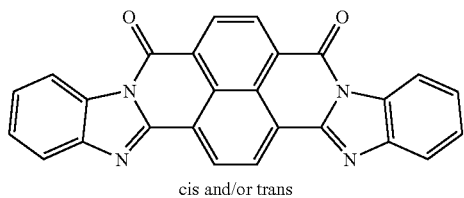

XX cis and/or trans having 6 $R^{12}$-groups and

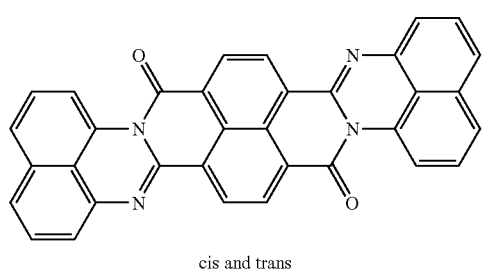

XXI cis and trans having 7 $R^{12}$-groups.

The process according to the invention comprises the reaction of the compounds of the general formulae (I) or (III) with electrophilic compounds of the general formula $R^{12}A$ or $R^{30}A$, preferably with corresponding iodides, i.e. A is iodine.

In a preferred embodiment, the process according to the invention is performed by preparing providing a dispersion of $R^{12}A$ or $R^{30}A$ and compound (I) or (III) in a suitable reactor, for example high-pressure reactor.

In general, the molar ratio of compound of the general formula (I) or (III) to electrophilic compounds $R^{12}A$ or $R^{30}A$ is 30:1 to 1:1, preferably 20:1 to 5:1, more preferably 15:1 to 10:1. Suitable electrophilic compounds $R^{12}A$ and $R^{30}A$ can be obtained by processes known to those skilled in the art and/or are commercially available.

The process according to the invention can be performed in the presence or absence of a solvent. Suitable solvents are those which behave inertly toward the reactants, for example hydrocarbons such as pentane, hexane, heptane, cyclohexane, perfluorohexane, hexafluorobenzene, perfluorodecalin, perfluorotoluene or perfluoroxylene. Another suitable solvent is DMSO. In a particularly preferred embodiment, the process according to the invention is performed in the absence of a solvent.

The process according to the invention is performed generally at a starting pressure above atmospheric pressure, preferably at a pressure of from 5 to 15 bar. Because gaseous reaction products are generated during reaction, the pressure increases during reaction. The pressure at the end of the reaction is preferably between 5 and 40 bar, particularly preferably 10 to 30 bar. In a preferred embodiment, the starting pressure in the reactor is generated by an inert gas, for example noble gas such as helium or argon, nitrogen or mixtures thereof, and by the autogenous pressure of the components of the reaction mixture at the appropriate temperature. The reaction temperature is generally from 50 to 350° C., preferably from 150 to 320° C., more preferably from 200 to 280° C.

The process can be conducted in the presence of metal compounds, e.g. $Cu_2O$ or Cu. In a preferred embodiment the process according to the present invention is conducted in the presence of $Cu_2O$ in a solvent, preferably in DMSO, and at atmospheric pressure.

In a particularly preferred embodiment the process according to the present invention is conducted in absence of a solvent, in absence of a metal compound and under increased pressure, preferably under the pressure as mentioned above.

In a preferred embodiment, the reactor is flushed before the start of the reaction with an inert gas, for example a noble gas such as helium or argon, nitrogen or mixtures thereof, under elevated pressure, for example from 1.5 to 25 bar, preferably from 2 to 10 bar, and then evacuated. This can be done several times in succession in order to free the reactor of reactive gases, for example oxygen from the ambient air.

The reaction of the compounds of the general formula (I) and (III) with $R^{12}A$ or $R^{30}A$ is performed generally for a period of from 1 to 12 hours, preferably from 2 to 8 hours, more preferably from 3 to 6 hours, for example 4 hours.

After the reaction has ended, the reaction mixture is worked up by methods known to those skilled in the art. For example, the mixture can be freed of by-products and/or unconverted substrates by extraction with suitable solvents, for example acetone, methyl t-butyl ether, perfluorinated solvents such as Galden HT60® or mixtures thereof. The crude product thus obtained can be purified by processes known to those skilled in the art, such as distillation or column chromatography with suitable mobile and stationary phases.

The substrates of the process according to the invention are obtainable by processes known to those skilled in the art.

The compounds of the general formula (I) which do not have any substituents $R^{12}$ and are used in the process according to the invention can be obtained by processes known to those skilled in the art. To this end, for example, in a first step, the commercially available dianhydride of perylene-3,4,9,10-tetracarboxylic acid, according to DE 25 19 790 A1, is converted to the corresponding chlorine-substituted dianhydride with a chlorinating agent, for example chlorine or sulfuryl chloride, by reaction in chlorosulfonic acid, concentrated sulfuric acid or oleum. In a second step, this chlorine-substituted dianhydride, for example according to EP 0 869 959 B1 and EP 0 873 342 B1, is converted to the corresponding diimide by reaction with a corresponding amine. The second step is followed, if appropriate, by a substitution of all or only some chlorine substituents by the substituents other than chlorine in the compounds of the general formula (I) without substituents $R^{12}$, so as to obtain the compounds of the general formula (I) without the substituents, which can be used in the process according to the invention.

The compounds of the general formula (III) without substituents $R^{30}$ are commercially available or are available by processes known to those skilled in the art.

The present invention also relates to fluorinated dyes of the general formula (I)

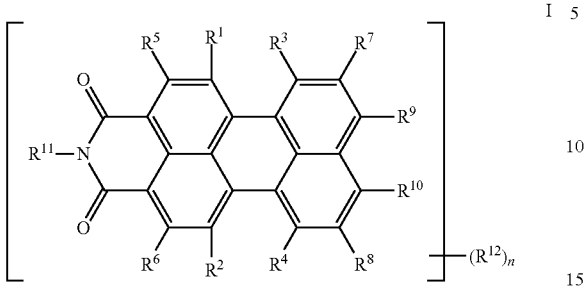

where
- $R^1$ to $R^8$ are each independently hydrogen, halogen or $R^{13}$—O— where $R^{13}$ is selected from the group consisting of phenyl, naphthyl, which may optionally be substituted by at least one $C_1$-$C_{20}$-alkyl radical, $C_2$-$C_{20}$-heteroalkyl-, $C_6$-$C_{22}$-aryl or heteroaryl radical, where the aryl and heteroaryl radicals are optionally bonded to the base structure via a saturated or unsaturated carbon bridge having from 1 to 6 carbon atoms and the alkyl-, heteroalkyl-, aryl- and heteroaryl radicals can be partially or fully fluorinated, and mixtures thereof,
- $R^9$, $R^{10}$ are each independently hydrogen, halogen, $C_6$-$C_{22}$-aryl radical, $C_6$-$C_{22}$-heteroaryl radical, CN, $R^{16}$—O—, $R^{16}$—S—, $R^{16}R^{17}$N—, where $R^{16}$ and $R^{17}$ are each independently selected from the group consisting of hydrogen, $C_1$-$C_{20}$-alkyl radical, $C_2$-$C_{20}$-heteroalkyl radical, $C_6$-$C_{22}$-aryl radical, $C_6$-$C_{22}$-heteroaryl radical, where the aryl and heteroaryl radicals are optionally bonded to the base structure via a saturated or unsaturated carbon bridge having from 1 to 6 carbon atoms and the alkyl-, heteroalkyl-, aryl- and heteroaryl radicals can be partially or fully fluorinated,
- $R^{11}$ is $C_1$-$C_{20}$-alkyl radical, $(CH_2)_oC_pF_{(2p+1)}$ where o is from 0 to 4 and p is from 1 to 12, or aryl selected from the group consisting of phenyl, naphthyl or mixtures thereof, which may be attached via a $C_1$-$C_3$ carbon chain, or in each case two of $R^{11}$ from two different molecules of the compound of the general formula (I), together form a saturated or unsaturated, branched or unbranched carbon chain having from 1 to 18 carbon atoms,
- $R^{12}$ is a fully or partly fluorinated $C_4$-$C_{12}$-alkyl radical and n is from 2 to 7, and mixtures thereof. For the preferred embodiments, reference is made to the above mentioned.

The present invention also relates to fluorinated dyes of the general formula (I)

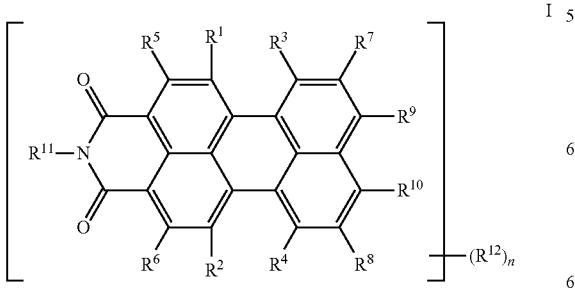

where
- $R^1$ to $R^8$ are each independently hydrogen or halogen and at least one of $R^1$ to $R^8$ is $R^{13}$—O— where $R^{13}$ is selected from the group consisting of phenyl, naphthyl, which may optionally be substituted by at least one $C_1$-$C_{20}$-alkyl radical, $C_2$-$C_{20}$-heteroalkyl-, $C_6$-$C_{22}$-aryl or heteroaryl radical, where the aryl and heteroaryl radicals are optionally bonded to the base structure via a saturated or unsaturated carbon bridge having from 1 to 6 carbon atoms and the alkyl-, heteroalkyl-, aryl- and heteroaryl radicals can be partially or fully fluorinated, and mixtures thereof,
- $R^9$, $R^{10}$ together form a cycle of the general formula (II)

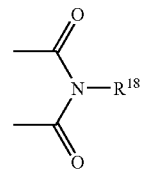

- $R^{11}$, $R^{18}$ are each independently $C_1$-$C_{20}$-alkyl radical, $(CH_2)_oC_pF_{(2p+1)}$ where o is from 0 to 4 and p is from 1 to 12, or aryl selected from the group consisting of phenyl, naphthyl or mixtures thereof, which may be attached via a $C_1$-$C_3$ carbon chain, or in each case two of $R^{11}$ and $R^{18}$ from two different molecules of the compound of the general formula (I), irrespective of the remaining $R^{11}$ and/or $R^{15}$, together form a saturated or unsaturated, branched or unbranched carbon chain having from 1 to 18 carbon atoms,
- $R^{12}$ is a fully or partly fluorinated $C_4$-$C_{12}$-alkyl radical, where a —$CF_2$— group is present directly on the aromatics and
- n is from 2 to 7, and mixtures thereof.

In a preferred embodiment of the compounds of the general formula (I) which have two imide functions, $R^1$ to $R^4$ are each halogen, for example chlorine, bromine or iodine, or $R^{13}$—O— where $R^{13}$ is phenyl or naphthyl, $R^5$ to $R^8$ are preferably each hydrogen, $R^{11}$ and $R^{18}$ are preferably each $(CH_2)_o C_pF_{(2p+1)}$ where o is 0 or 1 and p is from 6 to 9, more preferably 8, or —$(CH_2)_o$-phenyl or —$(CH_2)_o$-naphthyl where o is 1 or 2, $R^{12}$ is preferably a fully or partly fluorinated $C_6$-$C_{10}$-alkyl radical, having a —$CF_2$— group directly present on the aromatics, more preferably a —$C_8F_{17}$ radical. The radicals may be branched or linear, preferably linear. n is preferably from 2 to 7, more preferably from 2 to 5, in each case on average over all molecules present.

The present invention also relates to fluorinated dyes selected from the group consisting of compounds of the general formula (I)

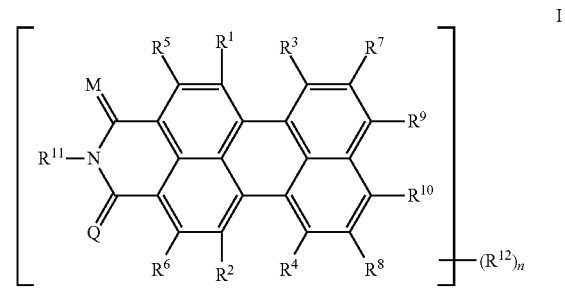

where

M, Q are each O or N—$R^{15}$, and one of M and Q is O and the other is N—$R^{15}$, and, $R^9$, $R^{10}$ are each independently hydrogen, halogen, $C_6$-$C_{22}$-aryl radical, $C_6$-$C_{22}$-heteroaryl radical, CN, where $R^{16}$ and $R^{17}$ are each independently selected from the group consisting of hydrogen, $C_1$-$C_{20}$-alkyl radical, $C_2$-$C_{20}$-heteroalkyl radical, $C_6$-$C_{22}$-aryl radical, $C_6$-$C_{22}$-heteroaryl radical, where the aryl and heteroaryl radicals are optionally bonded to the base structure via a saturated or unsaturated carbon bridge having from 1 to 6 carbon atoms and the alkyl-, heteroalkyl-, aryl- and heteroaryl radicals can be partially or fully fluorinated, or together form a cycle of the general formula II

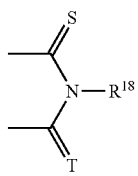

II where S and T are each O or N—$R^{19}$, and one of S and T is O and the other is N—$R^{19}$, compounds of the general formula (III)

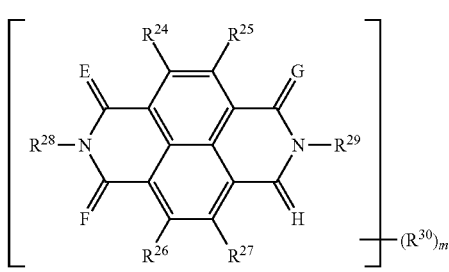

III and mixtures thereof, where $R^{12}$, $R^{30}$ are each independently a fully or partly fluorinated $C_4$-$C_{12}$-alkyl radical, where a —$CF_2$— group is present directly on the aromatics and E, F, G, H, $R^1$ to $R^8$, $R^{11}$, $R^{13}$ to $R^{29}$, n and m are each as defined above.

Compounds of the general formula (I), in which

M, Q are each O or N—$R^{15}$, and one of M and Q is O and the other is N—$R^{15}$, and, if present, S, T are each O or N—$R^{19}$, and one of S and T is O and the other is N—$R^{19}$ are compounds which have one —N═C—N— group or two —N═C—N— groups.

In a preferred embodiment, the present invention relates to compounds of the general formula (I) which have one —N═C—N— group or two —N═C—N— groups, and in which $R^1$ to $R^8$ are each selected from the group consisting of hydrogen, halogen, $C_6$-$C_{22}$-aryl radical, $C_6$-$C_{22}$-heteroaryl radical, $R^{13}$—O—, $R^{13}$—S— and $R^{13}R^{14}N$—, where $R^{13}$ and $R^{14}R^{13}$ is selected from the group consisting of $C_1$-$C_{20}$-alkyl radical, $C_6$-$C_{22}$-aryl or heteroaryl radical, where the aryl and heteroaryl radicals are optionally bonded to the base structure via a saturated or unsaturated carbon bridge having from 1 to 6 carbon atoms and the alkyl-, heteroalkyl-, aryl- and heteroaryl radicals can be partially or fully fluorinated.

In these compounds, $R^1$ to $R^4$ are more preferably each selected from the group consisting of hydrogen, halogen, $C_6$-$C_{22}$-aryl radical, $C_6$-$C_{22}$-heteroaryl radical, $R^{13}$—O—, $R^{13}$—S— and $R^{13}R^{14}N$—, where $R^{13}$ and $R^{14}$ are each independently selected from the group consisting of hydrogen, $C_1$-$C_{20}$-alkyl radical, $C_2$-$C_{20}$-heteroalkyl radical, $C_6$-$C_{22}$-aryl radical, $C_6$-$C_{22}$-heteroaryl radical, and $R^5$ to $R^8$ are each hydrogen; more preferably, $R^1$ to $R^4$ in these compounds are each hydrogen, fluorine, chlorine, bromine or iodine, $R^{13}$—, $R^{13}$—S—, where $R^3$ is selected from the group consisting of $C_1$-$C_{20}$-alkyl radical, $C_6$-$C_{22}$-aryl radical, for example phenyl or naphthyl, or $C_6$-$C_{22}$-heteroaryl radical, and $R^5$ to $R^8$ are each hydrogen.

In a further preferred embodiment, in the compounds of the general formula (I) which have one —N═C—N— group or two —N═C—N— groups, $R^{11}$ and $R^{15}$ and/or $R^{18}$ and $R^{19}$, in each case together with the —N—C═N— moiety, each independently form saturated or unsaturated, aliphatic or aromatic cycles having a total of from 4 to 8 ring atoms in each case, preferably 5 or 6 ring atoms, where at least one further ring having from 4 to 8 ring atoms may be attached to this ring and in turn, if appropriate, by at least one substituent selected independently from $C_1$-$C_{20}$-alkyl radical, preferably methyl $C_6$-$C_{22}$-aryl radical, preferably phenyl, $R^{22}$—O— or $R^{22}$—S—, where $R^{22}$ is selected from the group consisting of $C_1$-$C_{20}$-alkyl radical, preferably $C_1$-$C_6$-alkyl radical, $C_6$-$C_{22}$-aryl radical, for example phenyl or naphthyl, or $C_6$-$C_{22}$-heteroaryl radical.

In a particularly preferred embodiment, in these compounds, from 1 to 4, preferably 1 or 2, further aliphatic or aromatic cycles having in each case from 5 to 8, preferably 5 or 6 ring atoms, of which at least one may be a further heteroatom selected from the group consisting of N, O, P and S are bonded to the cycle which bears the —N—C═N— moiety and has a total of 5 or 6 ring atoms in each case.

In compounds of the general formula (I) in which $R^9$ and $R^{10}$ form a cycle of the general formula (II), and in which one of M and Q is N—$R^{15}$ and one of S and T is N—$R^{19}$, and in which $R^{11}$ with $R^{15}$ and $R^{18}$ with $R^{19}$, in each case together with the —N═C—N— moiety, form the abovementioned cycles, these compounds are either in cis arrangement or in trans arrangement.

When M is N—$R^{15}$ and S is N—$R^{19}$, the compound is in the cis arrangement. When M is N—$R^{15}$ and T is N—$R^{19}$, the compound is in the trans arrangement. When Q is N—$R^{15}$ and S is N—$R^{19}$, the compound is in trans arrangement. When Q is N—$R^{15}$ and T is N—$R^{19}$, the compound is in cis arrangement.

Very particularly preferred compounds of the general formula (I) in which $R^9$ and $R^{10}$ form a cycle of the general formula (II) and in which one of M and Q is N—$R^{15}$ and one of S and T is N—$R^{19}$, and in which $R^{11}$ with $R^{15}$ and $R^{18}$ with $R^{19}$, in each case together with the —N═C—N— moiety, form the abovementioned cycles.

In a further preferred embodiment, in compounds of the general formula (I) which have one —N═C—N— group or two —N═C—N— groups, $R^{12}$ is a fully or partly fluorinated $C_6$-$C_{10}$-alkyl radical, more preferably a —$C_8F_{17}$ radical. The radicals may be branched or linear, preferably linear. In these compounds a —$CF_2$— group is present directly on the aromatics.

In an other preferred embodiment the present invention relates to fluorinated dyes of the general formula (Ib)

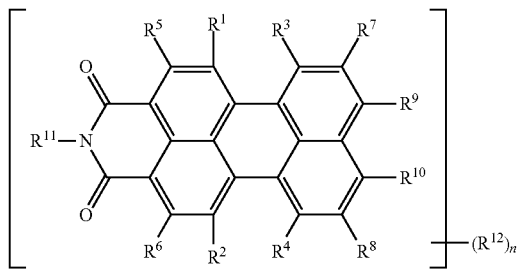

where
- $R^1$ to $R^8$ are hydrogen, $R^{13}$—S— or $R^{13}$—O—, wherein four of $R^1$ to $R^8$ are hydrogen and the remaining four of $R^1$ to $R^8$ are $R^{13}$—O—, where $R^{13}$ is selected from the group consisting of phenyl, naphthyl, which may optionally be substituted by at least one $C_1$-$C_{20}$-alkyl radical, $C_2$-$C_{20}$-heteroalkyl-, $C_6$-$C_{22}$-aryl or heteroaryl radical, where the aryl and heteroaryl radicals are optionally bonded to the base structure via a saturated or unsaturated carbon bridge having from 1 to 6 carbon atoms and the alkyl-, heteroalkyl-, aryl- and heteroaryl radicals can be partially or fully fluorinated, and mixtures thereof
- $R^9$, $R^{10}$ together form a cycle of the general formula (II)

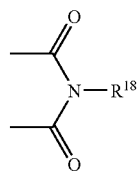

- $R^{11}$, $R^{18}$ are each independently $C_1$-$C_{20}$-alkyl radical, $(CH_2)_o C_p F_{(2p+1)}$ where o is from 0 to 4 and p is from 1 to 12, or aryl selected from the group consisting of phenyl, naphthyl or mixtures thereof, which may be attached via a $C_1$-$C_3$ carbon chain, or in each case two of $R^{11}$ and $R^{18}$ from two different molecules of the compound of the general formula (I), irrespective of the remaining $R^{11}$ and/or $R^{18}$, together form a saturated or unsaturated, branched or unbranched carbon chain having from 1 to 18 carbon atoms,
- $R^{12}$ is a branched or unbranched —$CH_2CH_2C_4F_9$ to —$CH_2CH_2C_{10}F_{21}$ or —S—$CH_2CH_2C_4F_9$ to —S—$CH_2CH_2C_{10}F_{21}$ radical and
- n is from 3 to 9, and mixtures thereof.

The compounds of formula Ib differ from the corresponding compounds of formula I having two imide functional groups or having one —N=C—N— group or two —N=C—N— groups in the point that in formula Ib $R^{12}$ is connected to the aromatics via a —$CH_2CH_2$— or a —S—$CH_2CH_2$-chain, whereas in corresponding compounds of formula I having two imide functional groups or having one —N=C—N— group or two —N=C—N— groups $R^{12}$ is connected to the aromatics via a —$CF_2$-group.

The preferred embodiments of compounds of formula Ib concerning $R^1$ to $R^8$, $R^{11}$, $R^{18}$ and n are the same as mentioned in respect of compounds of formula having two imide functional groups. Very preferred $R^{12}$ are —$CH_2CH_2C_4F_9$, —$CH_2CH_2C_6F_{13}$, —$CH_2CH_2C_8F_{17}$, —S—$CH_2CH_2C_4F_9$, —S—$CH_2CH_2C_6F_{13}$ and —S—$CH_2CH_2C_8F_{17}$.

Very preferred compounds of general formula (Ib) are chosen from the group consisting of compounds of formulae XV, XVI, XVII, XVIII and XIX

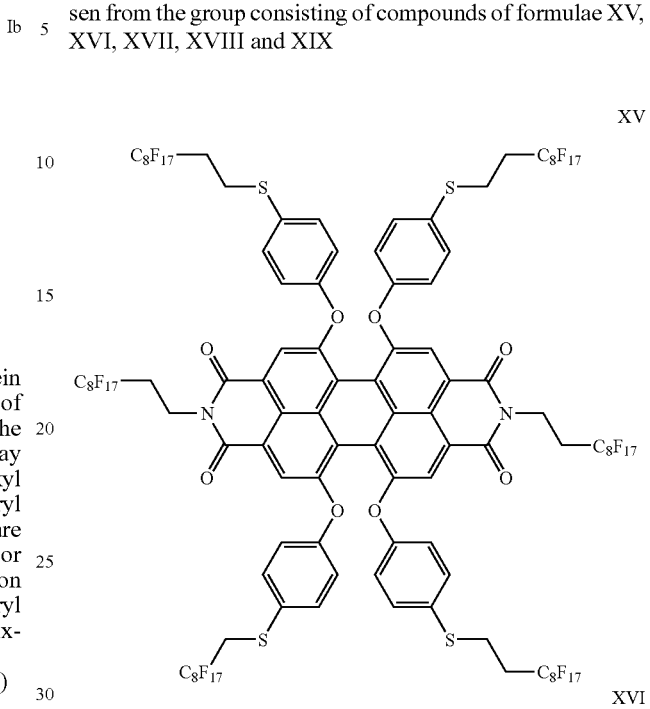

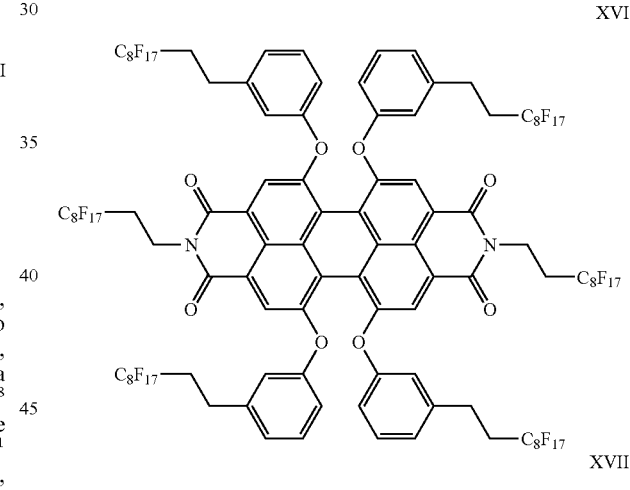

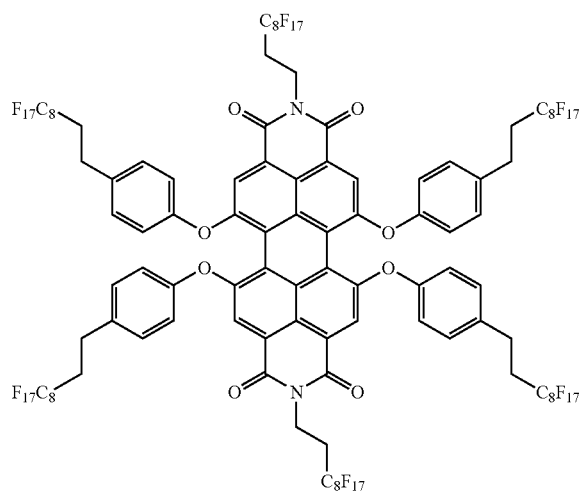

-continued

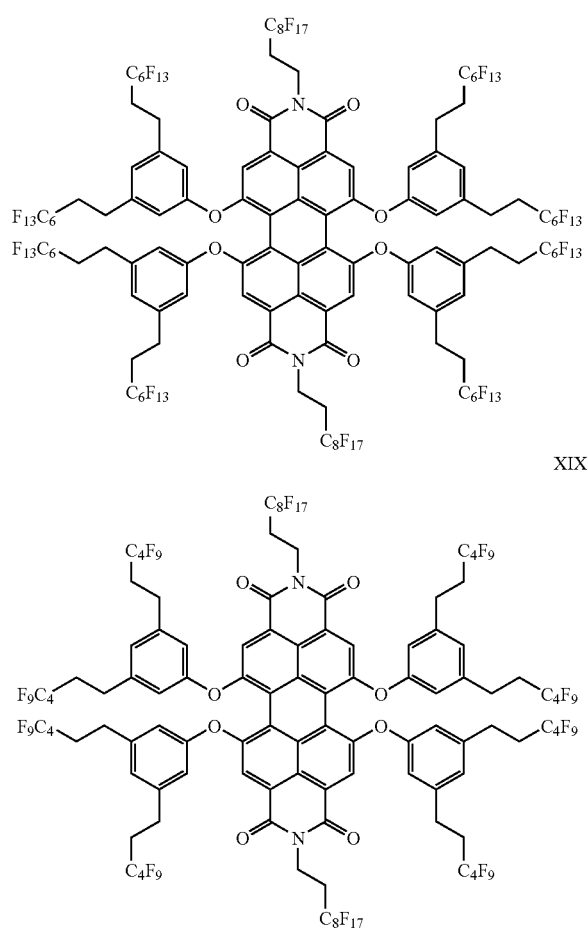

With regard to the compounds of the general formula (III) and the preferred embodiments, the same applies as was stated with regard to the process for their preparation.

The present invention also relates to fluorinated dyes selected from the group consisting of compounds of the general formulae (I), (III) and mixtures thereof with the abovementioned definitions of M, Q, E, F, G, H, $R^1$ to $R^{34}$, m and n, preparable by the process according to the invention.

The compounds of the general formula (I) and (III) prepared by the process according to the invention are notable, in the case of use in electrophoretic displays, for a greatly improved performance in comparison with compounds which are prepared by prior art processes. For example, all of the compounds prepared in accordance with the invention exhibit higher ME values, where ME stands for mass extinction. This is lower for compounds with a higher number of perfluorinated substituents ($R^{12}$ and $R^{30}$ in the formula I and III) than in corresponding compounds prepared by a prior art process. The by process according to the invention generally have fewer perfluorinated substituents than the compounds prepared by prior art processes. This has the consequence of the higher ME values of the compounds prepared in accordance with the invention. In addition, the OCR values of the compounds prepared by the process according to the invention, at 40 V, are significantly higher than OCR values of the prior art compounds. These results show that the process for preparing the compounds has a crucial influence on the molecular structure and hence on the properties of the compounds.

The present invention also relates to the use of fluorinated dyes selected from the group consisting of compounds of the general formulae (I), (III) and mixtures thereof with the abovementioned definitions of M, Q, E, F, G, H, $R^1$ to $R^{34}$, m and n in electrophoretic displays.

The inventive compounds are particularly readily soluble in, for example, fluorinated solvents such as perfluoroalkanes or perfluorocycloalkanes, for example perfluorodecalin, perfluoroarylalkanes, for example perfluorotoluenes or perfluoroxylenes, perfluoro-tert-amines, perfluoropolyethers, for example those from Solvay Solexis, and perfluoropolyethers (HT Series®) and hydrofluoropolyethers (ZT Series®) from Solvay Solexis, FC-430 (heptacosafluorotributylamine), FC-70® (perfluorotri-n-pentylamine), PF-5060® or PF5060DL® (perfluorohexane) from 3M®, HFE Novec® solvent from 3M® (fluorintated alkylether), e.g. HFE 7100 and HFE 7200, polymers or oligomers of low molecular weight, preferably below 50 000, more preferably below 20 000, for example poly(perfluoropropylene oxide) from TCI America, poly(chlorotrifluoroethylene) such as halocarbon oils from Halocarbon Product Corp. and Demnum lubricating oils from Daikin Industries. Particular preference is given to perfluoropolyethers and hydrofluoropolyethers such as HT-170®, HT-200®, HT-230®, ZT-180® (Solvay Solexis) and trifluoro(trifluoromethyl)oxirane homopolymers such as K6® and K7® liquids from Dupont.

EXAMPLES

1. Preparation of Tetrachloroperylenediimide ($Cl_4$-PDI)

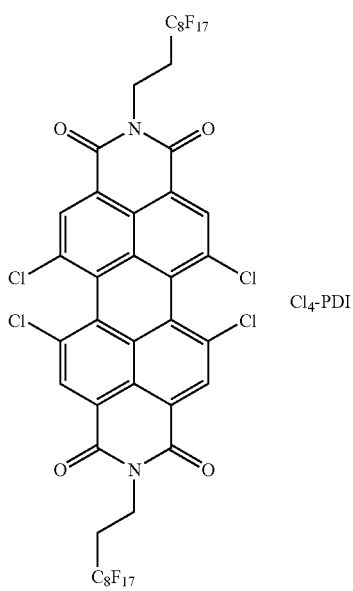

In a 4-liter three-neck round-bottom flask which is equipped with a mechanical stirrer and a 250 ml dropping funnel, 80 g of tetrachloroperylene dianhydride are dissolved in one liter of xylene. The mixture is degassed and purged three times with nitrogen. A mixture of 145.5 g of 1H,1H,2H, 2H-perfluorodecylamine and 50 ml of xylene is added at 110° C. to this xylene solution by means of a 250 ml dropping funnel within 15 minutes. The reaction mixture is stirred at 110° C. for 14 hours. The reaction mixture is cooled to 40° C. and was then filtered through a paper filter. The resulting solid is washed with one liter of xylene and 2 liters of ethanol. The residue is dried at 75° C. in a vacuum oven, and 210 g of Cl$_4$-PDY which comprised traces of xylene are obtained.

Maldi-MS (m/z): 1417.8

$^1$H-NMR (C$_2$D$_2$Cl$_2$): 8.75 (4H, s), 4.58 (4H, m), 2.62 (4H, m)

2. Preparation of Tetraphenoxyperylenediimide (TP-PDI)

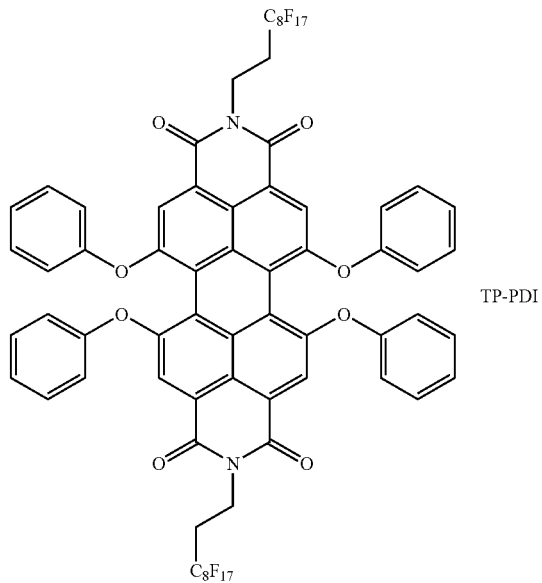

TP-PDI

In a 3-liter three-neck round-bottom flask which equipped with a mechanical stirrer and a 250 ml dropping funnel, 120 g of Cl$_4$-PDI, 63 g of phenole and 69 g of potassium carbonate are dissolved in 2.4 liters of NMP. The mixture is degassed and purged three times with nitrogen. The reaction mixture is stirred at 105° C. for 14 hours. The reaction mixture is cooled to 50° C. The reaction mixture is poured into a mixture of 54 g of concentrated sulfuric acid and 5 liters of water in a 10-liter vessel, and the resulting suspension is stirred at room temperature for 30 minutes. The precipitate is filtered off and washed four times with 1.5 liters of warm water. After the solid is washed with one liter of ethanol, this solid is added to one liter of ethanol and is stirred at 40° C. for one hour. The mixture is filtered. This step is repeated twice. The residue is dried at 75° C. in a vacuum oven and 115 g of a red solid are obtained. The dried solid is dissolved in 15 liters of methylene chloride and this solution is treated in an ultrasound bath for 30 min. The solution is poured onto a column comprising 3 liters of silica gel, and the compound TP-PDI is obtained by washing the column with methylene chloride. The solvent is removed under reduced pressure and the residue is dried at 75° C. in a vacuum oven in order to obtain 84 g of the pure product.

Maldi-MS (m/z): 1650.1

$^1$H-NMR (C$_2$D$_2$Cl$_2$): 8.18 (4H, s), 7.35 (8H, m), 7.19 (4H, m), 6.98 (8H, m), 4.42 (4H, m), 2.56 (4H, m)

3. Preparation of Perfluoroalkylated Tetraphenoxyperylenediimide (PF-TP-PDE, Inventive)

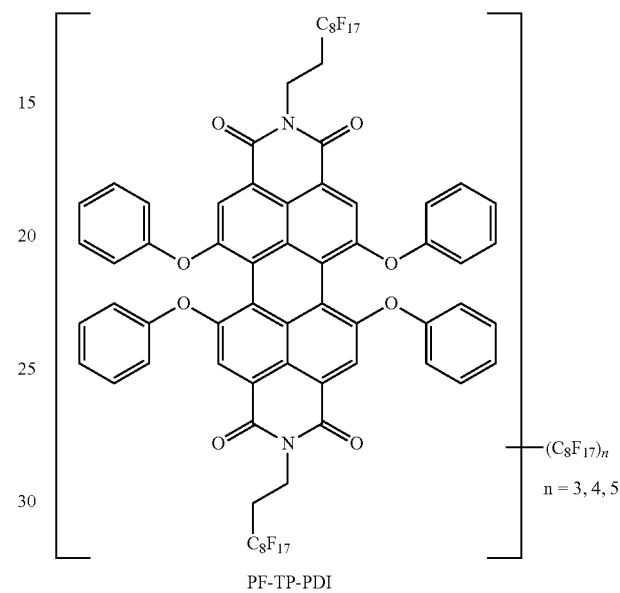

PF-TP-PDI

In this process step, a BASF Standard 300 ml HC4 high-pressure reactor is used. This has metallic connections to argon and nitrogen under and is located in a heated box and provided with a magnetic stirrer.

This high-pressure reactor is charged with 30 g of TP-PDI and 102 g (approx. 50 ml) of perfluorooctyl iodide. The reactor is evacuated and purged five times with argon. The reactor is brought to a pressure of 6 bar with argon. The reaction mixture is heated to 250° C. within from 45 to 60 min and stirred with a magnetic stirrer at 250° C. for four hours. The reactor is cooled to room temperature, evacuated and purged five times with 20 bar of nitrogen. The reactor is opened and a liquid with a high viscosity is obtained. This liquid with a high viscosity is introduced into a 1-liter flask; the reactor is washed five times each with 30 ml of acetone and 30 ml of HT60. The phases are separated from one another in a 2-liter separating funnel, and the HT60 phase is washed twice with 100 ml of acetone in a separating funnel. The collected HT60 phases are introduced into a 500 ml flask. The solvent is removed under reduced pressure and 59 g of a red solid ware obtained. This solid is dissolved in 3.5 liters of MTB ether and the resulting solution is divided into three portions of equal volume. One portion is introduced onto 1.2 liters of silica gel, and the compound is washed from the column with MTB ether. The column chromatography is also performed with the two other portions. The filtrates of these three portions are collected and combined. The MTB ether is removed under reduced pressure and the residue is dried at 75° C. under reduced pressure. 38 g of the product PF-TP-PDI are obtained.

Maldi-MS (m/z): 2904, 3322, 3740

In table 1 characteristics of the compounds prepared under increased pressure and characteristics of the corresponding compounds that are prepared using $Cu_2O$ in DMSO are shown. In table 1 n is the number of $R^{12}$-groups present in the compound, which are $C_8F_{17}$-groups in the examples, obtained from anionic MALD-MS-spectrum. ME means mass extinction in g/(kg*cm), OCR is "optical contrast ratio", which is the absolute value of the optical contrast ratio, T is the reaction temperature during the preparation of the compounds.

TABLE 1

| | | 37.5 $Cu_2O$, 15 $C_8F_{17}I$, DMSO, 140° C. | | | 10 $C_8F_{17}I$, 5-40 bar | | | |
|---|---|---|---|---|---|---|---|---|
| No. | compound | n | ME | OCR | n | ME | OCR | T (° C.) |
| 1 | [bis-benzimidazole perylene diimide, cis and trans] | 8-11 | 4 | 6 | 6-8 | 16 | 6 | 320 |
| 2 | [bis-naphthalimide/phenanthridine perylene, cis and trans] | 12-14 | 4 | 4 | 8-10 | 12 | 9 | 320 |
| 3 | [bis-benzoquinoxaline imidazole perylene, cis and trans] | 8-10 | 5 | 3 | 6-8 | 12 | 5 | 280 |
| 4 | [bis-benzimidazole terrylene diimide] | 6-7 | 6 | 3 | 5-6 | 10 | 5 | 320 |
| 5 | [naphthalimide/phenanthridine perylene, cis and trans] | 8-10 | 3 | — | 6-9 | 7 | 5 | 280 |

TABLE 1-continued
| | | 37.5 Cu₂O, 15 C₈F₁₇I, DMSO, 140° C. | | | 10 C₈F₁₇I, 5-40 bar | | | T |
|---|---|---|---|---|---|---|---|---|
| No. | compound | n | ME | OCR | n | ME | OCR | (° C.) |
| 6 | 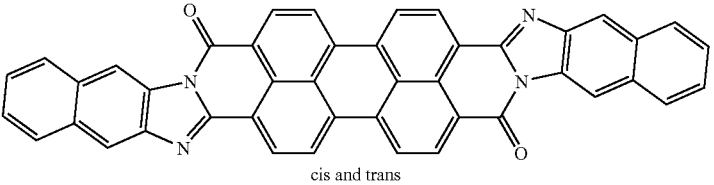 cis and trans | — | — | — | 8-10 | 11 | 6 | 280 |
| 7 | 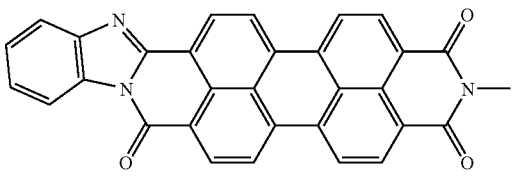 | 6-7 | 8 | 6 | 4-5 | 15 | 6 | 280 |
| 8 | 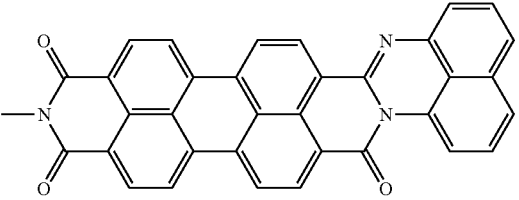 | — | — | — | 5-7 | 13 | 6 | 280 |
| 9 | 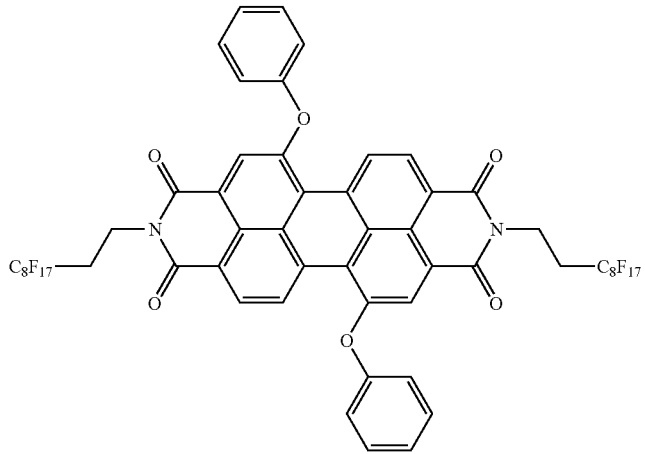 and/or | 4-6 | 5 | 13 | 3-4 | 15 | 9 | 250 |

TABLE 1-continued

| | | 37.5 Cu₂O, 15 C₈F₁₇I, DMSO, 140° C. | | | 10 C₈F₁₇I, 5-40 bar | | | T |
|---|---|---|---|---|---|---|---|---|
| No. | compound | n | ME | OCR | n | ME | OCR | (° C.) |
| | *(structure: perylene diimide with two phenoxy groups and two C₈F₁₇-ethyl N-substituents)* | | | | | | | |
| 10 | *(structure: perylene diimide with four phenoxy groups and two C₈F₁₇-ethyl N-substituents)* | 2-7 | 9 | 4 | 3-4 | 15 | 11 | 250 |
| 11 | *(structure: perylene diimide with Cl and three phenoxy groups and two C₈F₁₇-ethyl N-substituents)* | — | — | — | 3-4 | 14 | 14 | 250 |

TABLE 1-continued

| | | 37.5 Cu$_2$O, 15 C$_8$F$_{17}$I, DMSO, 140° C. | | | 10 C$_8$F$_{17}$I, 5-40 bar | | | T |
|---|---|---|---|---|---|---|---|---|
| No. | compound | n | ME | OCR | n | ME | OCR | (° C.) |
| 12 | 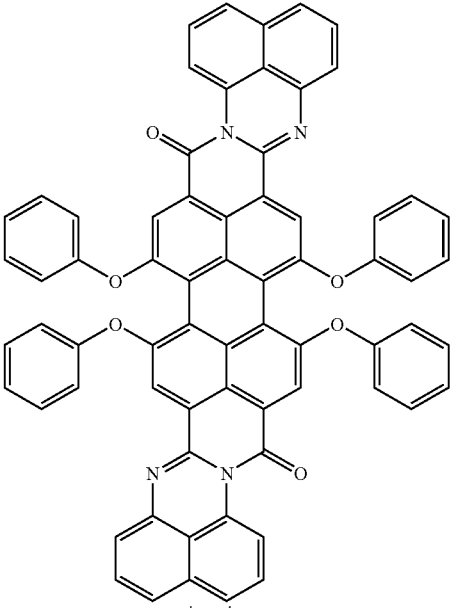<br>cis and trans | — | — | — | 9 | 9 | 6 | 260 |

For no. 12 no MS-spectrum can be obtained, n is calculated from elemental analysis.

4. Synthesis of Compounds XV to XIX

Compound XV:

To a solution of Cl$_4$-PDI (0.31 g, 0.22 mmol) and 4-(1H,1H,2H,2H-Perfluordecyl-1-thio)phenole (1.0 g, 1.7 mmol) in NMP (10 ml) is added K$_2$CO$_3$ (0.18 g, 1.3 mmol). The mixture is heated to 110° C. for 5 h. After cooling to r.t. the mixture is added to a solution of AcOH in H$_2$O (10%, 20 ml). Filtration and washing with hot H$_2$O and few EtOH gives the crude product. The dried crude product is extracted with PFS-2 in a Soxhlet-extractor, yielding pure XV (0.63 g, 81%).

Maldi-MS (m/z): 3562

General Procedure A:

The procedure is carried out under inert atmosphere and dry glass apparatus.

To a mixture of 9-BBN dimer (9-Borabicyclo[3.3.1]nonane dimer, 1.5 equiv.) in dry di-oxane (0.3 M) is slowly added a solution of R$_f$—CH═CH$_2$ (1 equiv.) in 1-(Ethoxy)nonafluorbutan (HFE-7200, 0.5 M) at r.t. After stirring for 6 h at 80° C., the mixture is cooled to r.t. and NaOH solution (3M, 1.4 equiv.) is added. The mixture is stirred for 30 min after which the corresponding iodophenole (0.45 equiv. I per 9-BBN unit) and Pd(dppf)CH$_2$Cl$_2$ (4 mol %) are added. The reaction is stopped after 48 h. Column Chromatography (SiO$_2$, CH$_2$Cl$_2$) gives the corresponding products A-D:

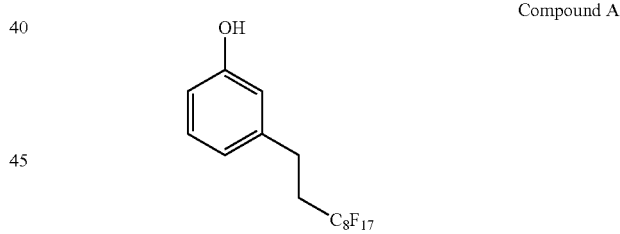

Compound A

Yield 78%

$^1$H-NMR (CD$_2$Cl$_2$): δ (ppm)=2.4 (m, 2H), 2.8 (m, 2H), 4.8 (br, 1H), 6.7 (quasi s, 2H), 6.8 (d, 1H), 7.2 (t, 1H).

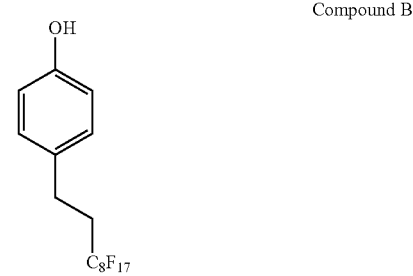

Compound B

Yield 25
$^1$H-NMR (CD$_2$Cl$_2$): δ (ppm)=2.4 (m, 2H), 2.8 (m, 2H), 5.0 (br, 1H), 6.8 (d, 2H), 7.1 (d, 2H).

Compound C

Yield 62%
$^1$H-NMR (CD$_2$Cl$_2$): δ (ppm)=2.4 (m, 4H), 2.8 (m, 4H), 5.1 (br, 1H), 7.0 (s, 2H), 7.1 (s, 1H).
EI-MS (m/z): 786

Compound D

Yield 15%
$^1$H-NMR (CD$_2$Cl$_2$): δ (ppm)=2.4 (m, 4H), 2.8 (m, 4H), 5.0 (br, 1H), 7.0 (s, 2H), 7.1 (s, 1H).
EI-MS (m/z): 587

General Procedure B:
To a solution of Cl$_4$-PDI (1 equiv.) and corresponding compound A-D (8 equiv) in NMP (0.012 M) is added K$_2$CO$_3$ (6 equiv.). The mixture is heated to 110° C. for 18-24 h. Filtration and washing with hot H$_2$O and few EtOH gives the crude product. Column chromatography (SiO$_2$, HFE7200/toluene 7:3) gives the corresponding pure products XVI-XIX:

XVI:
Yield 10%. Maldi-MS (m/z): 3434
XV:
Yield 10%. Maldi-MS (m/z): 3434
XVIII:
Yield 10%. Maldi-MS (m/z): 4418
XIX:
Yield 20%. Maldi-MS (m/z): 3618

The invention claimed is:

1. A process for preparing a fluorinated dye selected from the group consisting of a compound of the following general formula I:

I where

R$^1$ to R$^8$ are each independently selected from the group consisting of hydrogen, halogen, C$_6$-C$_{22}$-aryl radical, C$_6$-C$_{22}$-heteroaryl radical, CN, R$^{13}$—O—, R$^{13}$—S—, R$^{13}$R$^{14}$N—, where R$^{13}$ and R$^{14}$ are each independently selected from the group consisting of hydrogen, C$_1$-C$_{20}$-alkyl radical, C$_2$-C$_{20}$-heteroalkyl radical, C$_6$-C$_{22}$-aryl radical, C$_6$-C$_{22}$-heteroaryl radical, where the aryl and heteroaryl radicals are optionally bonded to the base structure via a saturated or unsaturated carbon bridge having from 1 to 6 carbon atoms and the alkyl-, heteroalkyl-, aryl- and heteroaryl radicals can be partially or fully fluorinated, M and Q are each O, R$^9$, R$^{10}$ together form a cycle of the general formula II

II where S and T are each O,

R$^{12}$ is a fully or partly fluorinated C$_4$-C$_{12}$-alkyl radical having a —CF$_2$— group that is bonded to the aromatic without an intervening oxygen or sulfur atom, and n is from 1 to 12, where, if R$^9$ and R$^{10}$ form a cycle of the general formula (II) and M, Q, S and T are each O, R$^{11}$ and R$^{18}$ are each independently selected from the group consisting of hydrogen, halogen, optionally partly or fully fluorinated C$_1$-C$_{20}$-alkyl radical, C$_1$-C$_{20}$-heteroalkyl radical, C$_6$-C$_{22}$-aryl radical and C$_6$-C$_{22}$-heteroaryl radical, where the aryl and heteroaryl radicals are optionally bonded to the nitrogen via a saturated or unsaturated carbon bridge having from 1 to 6 carbon atoms, and the alkyl or heteroalkyl radicals may have functional groups, or, if R$^9$ and R$^{10}$ form a cycle of the general formula (II) and M, Q, S and T are each O, each of R$^{11}$ and R$^{18}$ together form a saturated or unsaturated, branched or unbranched carbon bridge having from 1 to 18 carbon atoms between two molecules of the compound of the general formula (I) irrespective of the remaining R$^{11}$ and/or R$^{18}$, by reacting the corresponding compounds which do not have R$^{12}$ with compounds of the general formula R$^{12}$A, where A is selected from the group consisting of I and Br, and R$^{12}$ is as defined above.

2. The process according to claim 1, which is performed in the presence of Cu$_2$O in a solvent and under atmospheric pressure.

3. The process according to claim 1, which is performed in absence of a solvent, in absence of a metal compound and under increased pressure.

4. The process according to claim 1, which is performed at a temperature of from 150 to 320° C.

5. A fluorinated dye selected from the group consisting of:
(1) A fluorinated dye of the following general formula (I):

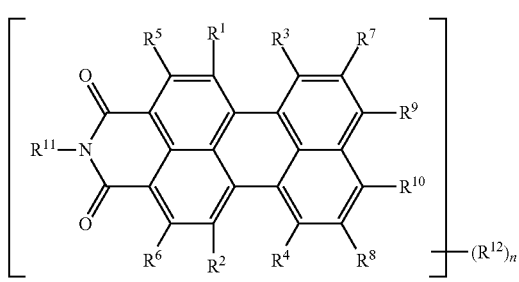

where
$R^1$ to $R^8$ are each independently hydrogen or halogen and at least one of $R^1$ to $R^8$ is $R^{13}$—O— where $R^{13}$ is selected from the group consisting of phenyl, naphthyl, which may optionally be substituted by at least one $C_1$-$C_{20}$-alkyl radical, $C_2$-$C_{20}$-heteroalkyl-, $C_6$-$C_{22}$-aryl or heteroaryl radical, where the aryl and heteroaryl radicals are optionally bonded to the base structure via a saturated or unsaturated carbon bridge having from 1 to 6 carbon atoms and the alkyl-, heteroalkyl-, aryl- and heteroaryl radicals can be partially or fully fluorinated, and mixtures thereof,
$R^9$, $R^{10}$ together form a cycle of the general formula (II)

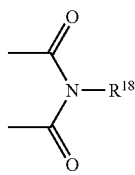

$R^{11}$, $R^{18}$ are each independently $C_1$-$C_{20}$-alkyl radical, $(CH_2)_o C_p F_{(2p+1)}$ where o is from 0 to 4 and p is from 1 to 12, or aryl selected from the group consisting of phenyl, naphthyl or mixtures thereof, which may be attached via a $C_1$-$C_3$ carbon chain, or in each case two of $R^{11}$ and $R^{18}$ from two different molecules of the compound of the general formula (I), irrespective of the remaining $R^{11}$ and/or $R^{18}$, together form a saturated or unsaturated, branched or unbranched carbon chain having from 1 to 18 carbon atoms,
$R^{12}$ is a fully or partly fluorinated $C_4$-$C_{12}$-alkyl radical having a —$CF_2$— group that is bonded to the aromatic without an intervening oxygen or sulfur atom, and
n is from 2 to 7,
and a mixture thereof;
(2) A fluorinated dye of the following general formula (Ib):

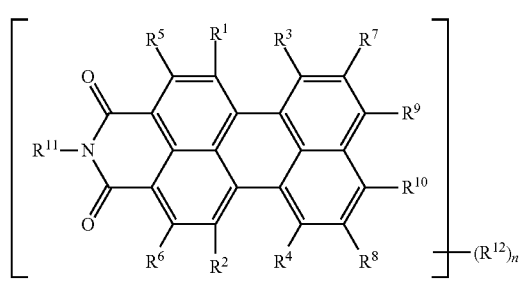

where
$R^1$ to $R^8$ are hydrogen $R^{13}$—S— or $R^{13}$—O—, wherein four of $R^1$ to $R^8$ are hydrogen and the remaining four of $R^1$ to $R^8$ are $R^{13}$—O—, where $R^{13}$ is selected from the group consisting of phenyl, naphthyl, which may optionally be substituted by at least one $C_1$-$C_{20}$-alkyl radical, $C_2$-$C_{20}$-heteroalkyl-, $C_6$-$C_{22}$-aryl or heteroaryl radical, where the aryl and heteroaryl radicals are optionally bonded to the base structure via a saturated or unsaturated carbon bridge having from 1 to 6 carbon atoms and the alkyl-, heteroalkyl-, aryl- and heteroaryl radicals can be partially or fully fluorinated, and mixtures thereof
$R^9$, $R^{10}$ together form a cycle of the general formula (II)

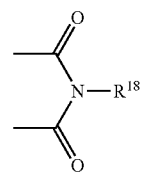

$R^{11}$, $R^{18}$ are each independently $C_1$-$C_{20}$-alkyl radical, $(CH_2)_o C_p F_{(2p+1)}$ where o is from 0 to 4 and p is from 1 to 12, or aryl selected from the group consisting of phenyl, naphthyl or mixtures thereof, which may be attached via a $C_1$-$C_3$ carbon chain, or in each case two of $R^{11}$ and $R^{18}$ from two different molecules of the compound of the general formula (I), irrespective of the remaining $R^{11}$ and/or $R^{18}$, together form a saturated or unsaturated, branched or unbranched carbon chain having from 1 to 18 carbon atoms,
$R^{12}$ is a branched or unbranched —$CH_2CH_2C_4F_9$ to —$CH_2CH_2C_{10}F_{21}$ radical, and
n is from 3 to 9,
and a mixture thereof; and
(3) a mixture of two or more of the fluorinated dyes (1) and (2).
6. An electrophoretic display comprising one or more of the fluorinated dyes according to claim 5.
7. The fluorinated dye according to claim 5, which is the fluorinated dye (1) of the following general formula (I):

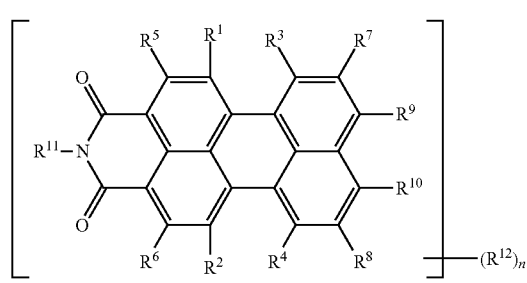

where
$R^1$ to $R^8$ are each independently hydrogen or halogen and at least one of $R^1$ to $R^8$ is $R^{13}$—O— where $R^{13}$ is selected from the group consisting of phenyl, naphthyl, which may optionally be substituted by at least one $C_1$-$C_{20}$-alkyl radical, $C_2$-$C_{20}$-heteroalkyl-, $C_6$-$C_{22}$-aryl or heteroaryl radical, where the aryl and heteroaryl radicals are optionally bonded to the base structure via a saturated or unsaturated carbon bridge having from 1 to 6 carbon atoms and the alkyl-, heteroalkyl-, aryl- and heteroaryl radicals can be partially or fully fluorinated, and mixtures thereof, $R^9$, $R^{10}$ together form a cycle of the general formula (II)

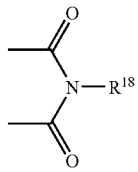

II $R^{11}$, $R^{18}$ are each independently $C_1$-$C_{20}$-alkyl radical, $(CH_2)_o C_p F_{(2p+1)}$ where o is from 0 to 4 and p is from 1 to 12, or aryl selected from the group consisting of phenyl, naphthyl or mixtures thereof, which may be attached via a $C_1$-$C_3$ carbon chain, or in each case two of $R^{11}$ and $R^{18}$ from two different molecules of the compound of the general formula (I), irrespective of the remaining $R^{11}$ and/or $R^{18}$, together form a saturated or unsaturated, branched or unbranched carbon chain having from 1 to 18 carbon atoms, $R^{12}$ is a fully or partly fluorinated $C_4$-$C_{12}$-alkyl radical having a —$CF_2$— group that is bonded to the aromatic without an intervening oxygen or sulfur atom, and n is from 2 to 7, or a mixture thereof.

8. The fluorinated dye according to claim 5, which is the fluorinated dye (2) of the following general formula (Ib):

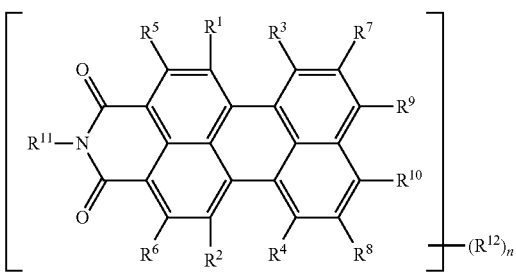

I where $R^1$ to $R^8$ are hydrogen $R^{13}$—S— or $R^{13}$—O—, wherein four of $R^1$ to $R^8$ are hydrogen and the remaining four of $R^1$ to $R^8$ are $R^{13}$—O—, where $R^{13}$ is selected from the group consisting of phenyl, naphthyl, which may optionally be substituted by at least one $C_1$-$C_{20}$-alkyl radical, $C_2$-$C_{20}$-heteroalkyl-, $C_6$-$C_{22}$-aryl or heteroaryl radical, where the aryl and heteroaryl radicals are optionally bonded to the base structure via a saturated or unsaturated carbon bridge having from 1 to 6 carbon atoms and the alkyl-, heteroalkyl-, aryl- and heteroaryl radicals can be partially or fully fluorinated, and mixtures thereof $R^9$, $R^{10}$ together form a cycle of the general formula (II)

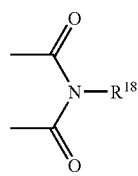

II $R^{11}$, $R^{18}$ are each independently $C_1$-$C_{20}$-alkyl radical, $(CH_2)_o C_p F_{(2p+1)}$ where o is from 0 to 4 and p is from 1 to 12, or aryl selected from the group consisting of phenyl, naphthyl or mixtures thereof, which may be attached via a $C_1$-$C_3$ carbon chain, or in each case two of $R^{11}$ and $R^{18}$ from two different molecules of the compound of the general formula (I), irrespective of the remaining $R^{11}$ and/or $R^{18}$, together form a saturated or unsaturated, branched or unbranched carbon chain having from 1 to 18 carbon atoms, $R^{12}$ is a branched or unbranched —$CH_2CH_2C_4F_9$ to —$CH_2CH_2C_{10}F_{21}$ radical, and n is from 3 to 9, or a mixture thereof.

9. The fluorinated dye according to claim 5, which is the mixture (3) of two or more of the fluorinated dyes (1) and (2).

* * * * *